(12) United States Patent
Wang et al.

(10) Patent No.: US 8,383,715 B2
(45) Date of Patent: Feb. 26, 2013

(54) PRIMER FOR FLUOROCARBON POLYMER SUBSTRATES

(75) Inventors: Ge Wang, Solon, OH (US); Dominic R. Cremona, Parma, OH (US)

(73) Assignee: Tremco Incorporated, Beachwood, OH (US)

( * ) Notice: Subject to any disclaimer, the term of this patent is extended or adjusted under 35 U.S.C. 154(b) by 741 days.

(21) Appl. No.: 12/121,252

(22) Filed: May 15, 2008

(65) Prior Publication Data

US 2009/0048384 A1    Feb. 19, 2009

Related U.S. Application Data

(60) Provisional application No. 60/964,794, filed on Aug. 15, 2007.

(51) Int. Cl.
*C08K 3/34*   (2006.01)
*C08L 31/00*   (2006.01)

(52) U.S. Cl. ......... 524/446; 524/445; 524/556; 427/322

(58) Field of Classification Search .................. 524/446, 524/556; 427/322
See application file for complete search history.

(56) References Cited

U.S. PATENT DOCUMENTS

| 4,138,384 A | 2/1979 | Neumann |
| 4,261,308 A | 4/1981 | Hadekel et al. |
| 4,495,228 A | 1/1985 | Cornwell |
| 4,696,319 A | 9/1987 | Gant |
| 5,158,918 A | 10/1992 | Brooks et al. |
| 6,284,037 B1 * | 9/2001 | Sapper .......................... 106/499 |
| 6,333,372 B1 | 12/2001 | Tomihashi et al. |
| 6,997,980 B2 * | 2/2006 | Wegner et al. ................ 106/403 |

FOREIGN PATENT DOCUMENTS

| JP | 50142629 | 5/1974 |
| JP | 04332756 | 5/1991 |
| JP | 2003532600 | 5/2000 |
| JP | 2004204073 | 12/2002 |

OTHER PUBLICATIONS

Hare, Clive H., "Protective Coatings Fundamentals of Chemistry and Composition, Co-Solvents as Coalescing Agents for Latex", 1994, pp. 390-392, Technology Published Company, Pittsburgh, Pennsylvania, SSPC94-17.

* cited by examiner

*Primary Examiner* — Vickey Nerangis
(74) *Attorney, Agent, or Firm* — Calfee, Halter & Griswold, LLP

(57) ABSTRACT

An aqueous primer dispersion which contains surfactant-stabilized polymer particles, an organic solvent and a mineral thicker, when coated onto a fluorocarbon substrate, significantly increase the bond strength between the fluorocarbon substrate and a subsequently applied water-derived protective coating, provided that the amount of surfactant-stabilized polymer particles in the aqueous primer dispersion, if any, is about 8 wt. % or less.

14 Claims, No Drawings

PRIMER FOR FLUOROCARBON POLYMER SUBSTRATES

CROSS REFERENCE TO RELATED APPLICATION

This application claims the benefit of U.S. Provisional Patent Application Ser. No. 60/964,794, entitled "PRIMER FOR FLUOROCARBON POLYMER SUBSTRATES", filed Aug. 15, 2008, the entire contents of which are incorporated herein by reference.

BACKGROUND

Homopolymers, copolymers (including those formed from three or more monomers) and polymer blends of polyvinylidene fluoride ("PVDF") enjoy wide use in a variety of different applications including the high purity semiconductor industry, the pulp and paper industry, nuclear waste processing industry, general chemical processing industry, food and pharmaceutical processing industry, and so forth.

In a particularly interesting application, high molecular weight polyvinylidene fluoride homopolymers blended with one or more additional resins are used in liquid coating formulations to provide colored coatings to various architectural substrates such as metal siding and roofing, storefront extrusions, curtain walls, louvers, skylights and other miscellaneous metal trim and extrusions. Typically, such liquid coating formulations are factory applied to a properly cleaned, pretreated and primed metal substrate and then oven baked. Typical substrates include aluminum, hot dip galvanized steel, G90 steel (galvanized steel produced by hot dipping to ASTM A653), and 55% aluminum zinc alloy coated steel.

Although such colored coatings exhibit excellent abrasion and weather resistance, they still wear out over time. As a result, attempts have been made to overcoat these products with conventional aqueous polymer dispersion-based paints and/or other roofing products. Unfortunately, such products adhere rather poorly to the PVDF substrate, even if primed with acids or organic solvents.

SUMMARY OF THE INVENTION

In accordance with this invention, it has been found that strongly adherent polymer coatings derived from aqueous polymer dispersions can be formed on fluorocarbon polymer substrates in general, and especially those formed from a blend of a fluorocarbon resin and another synthetic resin, by treating the substrate with an aqueous primer dispersion, provided that (1) the amount of surfactant-stabilized polymer particles included in the aqueous primer dispersion is maintained below about 8 wt. %, (2) a small but suitable amount of an organic solvent for the polymer particles is also included in the aqueous primer dispersion, and (3) a small but suitable amount of a mineral thickener is also included in the aqueous primer dispersion.

Thus, this invention provides an aqueous primer dispersion for use in coating a fluorocarbon substrate to increase the adhesive strength between the fluorocarbon substrate and a subsequently applied water-derived protective coating, the aqueous primer dispersion comprising polymer particles, an organic solvent for the polymer particles, and a mineral thicker, wherein the amount of surfactant-stabilized polymer particles in the aqueous primer dispersion, if any, is about 8 wt. % or less.

In addition, this invention also provides an aqueous primer dispersion for use in coating a fluorocarbon substrate to increase the adhesive strength between the fluorocarbon substrate and a subsequently applied water-derived protective coating, the aqueous primer dispersion being obtained by combining about 0.5-10 wt. % of at least one aqueous source dispersion of surfactant-stabilized polymer particles, about 25-400 wt. % based on the weight of the polymer particles of an organic solvent for the polymer particles, and a mineral thicker wherein the weight ratio of mineral thickener to polymer particles is between about 0.5:1 to 10:1.

In addition, this invention further provides a process for increasing the bond strength between a fluorocarbon substrate and a water-based protective coating on the substrate comprising depositing an aqueous primer dispersion as described above on the substrate to form a coherent primer layer before application of the protective coating.

DETAILED DESCRIPTION

In accordance with this invention, the adhesive strength between a fluorocarbon substrate and a subsequently applied water-derived protective coating can be significantly increased by priming the fluorocarbon substrate with an aqueous primer dispersion provided that (1) the amount of surfactant-stabilized polymer particles in the aqueous primer dispersion, if any, is about 8 wt. % or less, (2) a small but suitable amount of an organic solvent for the polymer particles of the aqueous primer dispersion is also included in the dispersion, and (3) a small but suitable amount of a mineral thicker is also included in the aqueous primer dispersion.

DEFINITIONS

"Dispersion" means a composition in which particles of a natural or synthetic polymer are dispersed in a liquid medium.

"Emulsion," as used herein, is synonymous with dispersion.

"Free surfactant" refers to a surfactant or emulsifier which is not chemically combined with the polymer particles being dispersed, i.e., a separate chemical compound from the polymer particles being dispersed. Some polymers include pendant and/or internal groups which exhibit a surface active effect, i.e., they tend to cause particles of the polymer in which they are contained to form stable aqueous dispersions. Examples include Setalux 6756 AQ40 and Setalux 6768 AQ40 available from Akzo Nobel. "Free surfactants" in the context of this invention does not include such pendant and/or internal groups, the monomers supplying such pendant and/or internal groups or the polymers containing such pendant and/or internal groups.

"High glass transition temperature" means a glass transition temperature, $T_g$, which is 30° C. or above.

"Primer particles" refers to the polymer particles in the inventive aqueous primer dispersions. Normally, the primer particles are derived from a "source dispersion."

"Source dispersion" refers to the aqueous dispersions of surfactant stabilized polymer particles that are normally used to make the inventive aqueous primer dispersions. Commercially available source dispersions typically contain about 30-70 wt. % surfactant stabilized polymer particles made from a wide variety of different polymers.

"Solvent" in relation to a particular polymer means a liquid which, when contacted with that polymer after it is formed, partially dissolves, or at least substantially swells, that polymer without being permanently bonded to or incorporated into the polymer. A solvent is therefore different from a plasticizer or a coalescing agent which remain in, or on, the polymer essentially indefinitely or permanently.

"Surfactant-stabilized polymer particles" refers to polymer particles which are contained in or derived from stable aqueous dispersions in which the polymer particles are dispersed by means of a free surfactant. "Stable" in this context means that there is no significant separation of the polymer particles from the aqueous phase of the dispersion after the dispersion is left to sit undisturbed for six months at room temperature.

"Water-derived protective coating" means a coating or other layer of a polymeric substance whose primary function is to protect the substrate from the effects of the weather, to color the substrate, or both, and which is formed by depositing an aqueous dispersion of the polymeric substance on a substrate.

"Waterproofing coating" means a water-derived protective coating which is resistant to penetration of liquid water and which is especially formulated for covering roofs and foundations of building structures. A waterproofing coating is therefore different from a paint, which is formulated primarily for providing permanently colored protective coatings on walls. In addition, it is also different from a sealant or caulk, which is a material of generally higher viscosity intended to be laid down as bead in a crack or opening.

Substrate

This invention is directed to improving the adhesive strength of the bond formed between a fluorocarbon substrate and a subsequently-applied water-based protective coating. By "fluorocarbon" is meant a solid polymer which contains a polymerized fluorine-containing monomer such as vinyl fluoride, vinylidene fluoride, 1,1,2-trifluoroethylene, tetrafluoroethylene, 1,1-difluoro-2-chloroethylene, 1,1-dichloro-2-fluoroethylene and the like. Most common are vinyl fluoride and vinylidene fluoride.

The fluorocarbon substrate can be composed entirely of the fluorocarbon polymer or a blend of the fluorocarbon polymer and another non-fluorinated resin. In addition, fluorinated polymer can also be a copolymer of one or more fluorinated monomers and one or more non-fluorinated copolymerizable monomers. Examples of non-fluorinated monomers which are useful for this purpose include acrylic and methacrylic acids and their $C_1$-$C_{12}$ esters, various vinyl monomers such as vinyl chloride, vinyl bromide, vinyl alcohol, various dicarboxylic acids, anhydrides and their $C_1$-$C_{12}$ esters such as maleic anhydride, various nitrites such as acrylonitrile, methacrylonitrile and the like, and so forth. Examples of non-fluorinated resins that can be blended with the fluorocarbon polymer include polymers and copolymers made from the above non-fluorinated monomers.

Fluorocarbon substrates of special interest are those made from vinylidene fluoride homopolymers and copolymers such as the Kynar® and Kynar Flex® lines of fluorocarbon resins available from Arkema, Inc. of Philadelphia, Pa. The Kynar® line of fluorocarbon resins is composed of a group of polyvinylidene fluoride homopolymers, i.e., homopolymers of 1,1-di-fluoroethene. They are tough engineering thermoplastics that exhibit a unique combination of properties including excellent stability when exposed to harsh thermal, chemical and ultraviolet environments. They can be readily melt-processed by standard methods of extrusion and injection/compression molding and are readily dissolved in polar solvents such organic esters and amines at elevated temperatures.

Meanwhile, the Kynar Flex® fluorocarbon resins, which are believed to be vinylidene fluoride copolymers, are similar to the Kynar® resins but posses unique combinations of additional chemical compatibility in high pH solutions, increased impact strength at ambient and colder temperature, and increased clarity.

Fluorocarbon substrates of particular interest are blends of vinylidene fluoride homopolymers and up to about 30 wt. % of one or more additional resins, most commonly acrylic resins, although other resins can be used. In this context, "acrylic resins" means resins containing at least about 10 wt. % of one or more acrylic monomers, i.e., acrylic acid, methacrylic acids and their $C_1$-$C_{12}$ esters. These blends are available from a variety of different sources under the designation Kynar 500®. Acrylic resins containing at least about 50 wt. % of one or more acrylic monomers are especially interesting.

Normally, the concentration of the polymerized fluorine-containing monomer in the fluorocarbon substrate will be at least about 50 wt. %, based on the weight of the fluorocarbon substrate, whether the fluorocarbon substrate is composed solely of the fluorocarbon polymer or a blend of the fluorocarbon polymer and one or more additional resins. More typically, the concentration of the polymerized fluorine-containing monomer in the fluorocarbon substrate will be at least about 70 wt. %, at least about 80 wt. %, or even at least about 90 wt. %.

Aqueous Primer Dispersion

In accordance with this invention, the adhesive strength between a fluorocarbon substrate and a subsequently applied water-derived protective coating can be significantly increased by coating the fluorocarbon substrate with an aqueous primer dispersion provided that (1) the amount of surfactant-stabilized polymer particles in the aqueous primer dispersion, if any, is about 8 wt. % or less, (2) a small but suitable amount of an organic solvent for the polymer particles in the aqueous primer dispersion is also included in the dispersion, and (3) a small but suitable amount of a mineral thicker is also included in the aqueous primer dispersion.

A primary ingredient of the inventive aqueous primer dispersions of this invention is dispersed polymer particles. They can be made from essentially any polymer, general examples of which include acrylic resins, SBR resins (styrene-butadiene rubber), polychloroprene resins, 2-chlorobutadiene, SA resins (styrene-acrylics), NBR resins (nitrile-butadiene rubber), vinyl acrylics, polyvinylidene chlorides and polyurethanes. Such polymer resins can be in unmodified form, i.e., they can contain only the particular monomers indicated, or they can be modified to contain suitable amounts of additional comonomers, all as well known in the art. In this context, reference to a particular type of resin in this document will be understood as referring to both the unmodified and the modified resin. Thus, for example, reference to an "SBR" resin herein will be understood as referring to unmodified polymer resins containing only styrene and butadiene, as well as modified polymer resins containing one or more additional comonomers as well as styrene and butadiene.

A particularly interesting type or class of polymers for forming such dispersed polymer particles are the acrylic polymers, i.e., polymers and copolymers containing at least about 10 wt. % of one or more polymerized monomers selected from $C_1$-$C_{12}$ alkyl(meth)acrylates, more typically $C_1$-$C_4$ alkyl(meth)acrylates and especially methyl methacrylate. In this context, "(meth)acrylate" means acrylate, methacrylate or both. Copolymers of such alkyl(meth)acrylates can be composed of two or more of these alkyl(meth)acrylates and can also contain up to about 90 wt. %, more typically up to about 70 wt. % of one or more additional copolymerizable monomers such as ethylene, propylene and other mono-unsaturated hydrocarbons having up to 12 carbon atoms, vinyl monomers such as vinyl chloride, vinylidene chloride, styrene, α-methyl styrene and other vinyl aromatics containing no more than about 12 carbon atoms. Such polymers may also include comonomers providing cross-linking sites such as butadiene, isoprene and other multifunctional vinyl monomers as well as alkali and alkaline earth metal salts of acrylic and methacrylic acid, for example.

Polymers with essentially any glass transition temperature can be used. For example, polymers with glass transition temperatures as low as −76° F. (−60° C.) and as high as 212° F. (100° C.) can be used. However, polymers having high glass transition temperatures, i.e., glass transition temperatures of 30° C. or above are more interesting, with polymers having glass transition temperatures of about 40° C. or above, 50° C. or even 60° C. or above, are especially interesting.

The average particle size of the dispersed polymer particles in the inventive aqueous primer dispersions can vary widely and essentially any average particle size can be used. Normally, the average particle size will be above the nanoparticle size range, i.e. above about 100 nm, although nanoparticle aqueous dispersions can also be used. In addition, the average particle size will also normally be below about 10μ (micron), more typically below about 5μ. Normally, the average particle size of the polymer particles in these dispersion will be about 0.1 to 2μ (micron), more typically about 0.2 to 1μ, or even about 0.3 to 0.7μ.

The dispersed polymer particles in the inventive aqueous primer dispersions, i.e. the "primer polymer particles," are most conveniently supplied and/or derived from a commercially available "source dispersion," i.e., a dispersion containing polymer particles stably dispersed in the aqueous phase by means of one or more free surfactants typically in a concentration range of about 30-70 wt. %. Specific examples of such source dispersions containing acrylic polymers include Carboset 2254, EPS 2718, Ucar 163 S, Rhoplex B-15J, Ucar 9192, Pilotec PA 91, Pilotec PA 90, Ucar E 693 and Pilotec CR 78. Specific examples of such source dispersions containing styrene acrylic polymers include Rhoplex EC 3814, Ucar 169S, Rhoplex AS 48, Ucar 6030, Acronal S 504, Ucar 100, Ucar 452, Ucar 451, Rhoplex WL 100. Specific examples of such source dispersions containing styrene butadiene polymers include Butanol NS 175, Butafan NS 222, Ucar DM 171, Styrofan ND 593, Styrofan ND 614, Ucar DL 41225, Butanol NS 175, Butafan NS 222 and Ucar DM 171. Specific examples of such source dispersions containing vinyl acrylic polymers include Ucar 162 and Ucar 357. A specific example of a source dispersion containing a polyvinylidene chloride polymer is Polidene 33-075, while a specific example of a source dispersion containing a polyurethane polymer is Sancure 2026.

As well known in the art, aqueous polymer dispersions such as the source dispersions described above are commonly made by emulsion or suspension polymerization techniques in which the monomers forming the polymers are suspended or emulsified in water by means of suitable free surfactants. The polymer particles formed by this polymerization, which also tend to be suspended and/or emulsified in the water by these free surfactants, are referred to herein for convenience as "surfactant stabilized polymer particles." In accordance with this invention, it has been determined that these free surfactants adversely affect the adhesion-promoting ability of the aqueous priming dispersions made from these source dispersions. In particular, it has been determined that, if the amount of surfactant-stabilized polymer particles included in the inventive aqueous primer dispersions exceeds about 8 wt. % based on the weight of the primer dispersion as a whole, then the adhesive strength of the bond between a fluorocarbon substrate primed with this primer dispersion and a subsequently applied water-derived protective coating begins to diminish. Therefore, it is desirable in accordance with this invention, at least when surfactant-stabilized polymer particles are used, to keep the concentration of these surfactant-stabilized polymer particles at or below about 8 wt. %, more commonly about 6 wt. % or less. Thus, it is desirable to limit the amount of source dispersions used to make the inventive aqueous primer dispersion to about 10 wt. % or less, more commonly about 8 wt. % or less, about 6 wt. % or less, about 4.0 wt. % or less or even 3.5 wt. % or less.

Although not wishing to be bound to any theory, it is believed that the decrease in adhesion-promoting effect realized when greater amounts of surfactant-stabilized polymer particles are used is due to too much free surfactant being present in the primer dispersion. In particular, it is believed that when a water-derived protective polymer coating is formed on a primer layer containing too much free surfactant, the primer layer absorbs and hence becomes weakened by the aqueous phase of the water-derived protective coating. In contrast, when the concentration of surfactant-stabilized polymer particles is low, a not-insignificant portion of the free surfactant separates from these particles into the aqueous phase of the primer dispersion. Then, when the primer dispersion dries, any separated free surfactant not carried off by the evaporating water deposits on the upper surface of the dried polymer layer that is formed. This surface-located free surfactant does not foster absorption of water in the body of the dried polymer layer, and so this dried polymer layer remains securely bound to the substrate. Therefore, it is desirable to keep the concentration of the surfactant-stabilized polymer particles relatively low, e.g., at or below about 8 wt. %, because this reduces the amount of surfactant in the dried primer layers ultimately formed from the inventive aqueous primer dispersions.

The minimum amount polymer particles included in the inventive aqueous primer dispersions should be enough to provide a noticeable increase in its adhesion promoting effect. In general, this means that the inventive aqueous primer dispersions should contain at least about 0.25 wt. % polymer particles, more commonly at least about 0.5 wt. %, at least about 1.0 wt. % or even at least about 1.25 wt. % polymer particles. Measured in terms of the source dispersions used to make the inventive aqueous primer dispersions, this translates to a concentration of at least about 0.5 wt. %, more commonly at least about 1.0 wt. %, at least about 2.0 wt. %, or even at least about 2.5 wt. %.

It is also contemplated that the inventive aqueous primer dispersions can be formulated from unstabilized aqueous polymers dispersions, i.e., aqueous dispersions of polymer particles containing no free surfactant. In addition, the inventive aqueous primer dispersions can also be formulated from self-stabilized aqueous polymers dispersions, i.e., aqueous dispersions of polymers including pendant and/or internal groups which provide their own surface active effects. In these instances, the inventive aqueous primer dispersions can contain more polymer particles than those discussed above, since the amount of free surfactant which is contributed to the product primer dispersions from these source dispersions is significantly less. If so, the amount of source dispersion used should not be so much that application of the inventive primer dispersion becomes difficult. In this connection, the inventive aqueous primer dispersions form dried primer layers of relatively uniform thickness on the order of about 5-100μ (microns) thick, more commonly about 20-50μ thick. Therefore, the concentration of such non-stabilized polymer particles is desirably kept low enough so that uniform coatings of such small thicknesses can be easily formed.

In the same way, it is also contemplated that the inventive aqueous primer dispersions can be formulated from partially stabilized aqueous polymers dispersions, i.e., aqueous dispersions of polymer particles in which the dispersion contains some free surfactant but not so much that stable dispersions are formed. In this instance, the inventive aqueous primer dispersions can also contain more polymer particles than those discussed above so long both of the above problems are avoided. That is, the amount of polymer particles used should not be so much that adhesion of the primer layer formed the inventive aqueous primer dispersion is weakened and/or application of the inventive primer dispersion becomes difficult.

Solvent

The second component of the inventive aqueous primer dispersion is an organic solvent for the polymer forming the polymer particles in this dispersion. Essentially any organic solvent which will soften these polymer particles and yet has a vapor pressure which is high enough so that it won't remain in the polymer indefinitely or permanently can be used for this purpose. Such organic solvents may be miscible or compatible with water, if desired. However, this is not necessary, as traditional organic solvents which are completely immiscible with water can also be used.

For example, common solvents such as aromatic and aliphatic (both saturated and unsaturated) hydrocarbon solvents, oxygenated organic solvents, other polar organic compounds and naturally-occurring solvents can be used. Specific examples include mineral spirits, various petroleum fractions such as gasoline, kerosene, jet fuel and the like, esters, organic acids, anhydrides, alcohols, glycols, polyols, glycol ethers, furans, amines, amides, nitrites, turpentine, essential oils, terpenes and the like. More interesting materials are the $C_5$ to $C_{20}$ paraffins, $C_2$ to $C_{16}$ alcohols, $C_3$ to $C_{12}$ glycols, $C_3$ to $C_{12}$ polyols, $C_6$ to $C_{16}$ glycol ethers, d-limonene and β-pinene. Especially interesting solvents are the $C_9$ to $C_{16}$ normal and iso-paraffins, especially the $C_{10}$ and $C_{11}$ normal paraffins and the $C_9$ to $C_{12}$ iso-paraffins, $C_6$ to $C_{12}$ glycol ethers and d-limonene. Particular examples are hexane, heptane, octane, etc., benzene, toluene, xylene and their derivatives, diethyl ether, chloroform, methyl acetate, ethyl acetate, dichloromethane, 1,4-dioxane, tetrahydrofuran, acetone, acetonitrile, dimethylformamide, dimethyl sulfoxide, acetic acid, n-butanol, isopropanol, n-propanol, ethanol, acetone, PCBTF, methylene chloride, volatile methyl siloxanes, mineral spirits and a host of chlorofluoro hydrocarbons can be used.

Preferably, however, solvents which are environmentally-friendly and non-toxic or at least of low toxicity. Examples of such organic solvents include N-methyl pyrrolidone ("NMP") and its analogs, e.g., pyrrolidones having a hydrogen or $C_{1-4}$ alkyl attached to the nitrogen of the pyrrolidone ring can also be used. Lactones, which are cyclic esters in which the main ring has four to seven atoms, two of which are provided by the ester group (—CO—O—), can be used. Specific examples are β-propiolactone, β-butyrolactone, 4-hydroxy-3-pentenoic acid γ-lactone, γ-butyrolactone, γ-crotonolactone, γ-valerolactone, γ-caprolactone, δ-valerolactone and ε-caprolactone. In addition, organic esters having 6 to 10 carbon atoms, preferably 7, 8 or 9 carbon atoms, can also be used. Specific examples are isobutyl isobutyrate, propyl heptanoate and heptyl propionate. Other naturally-occurring esters, as well as propylene carbonate, can also be used, as can propionate $C_1$-$C_8$ alkyl esters, glycol ethers, isobutyl isobutyrate, analogs of isobutyl isobutyrate such as other esters having seven, eight or nine carbon atoms can also be used. Mixtures of esters containing at least three of hexyl, heptyl, octyl, nonyl and decyl acetates, such as the line of mixed esters sold by Exxon Chemical Company under the designation Exxon Exxates, can also be used. Mixtures of these organic liquids can also be used. Solvents of this type which are miscible or at least compatible with water are particularly interesting.

Of special interest are those organic solvents which are non-toxic according to 16 CFR 1500.3(c)(2)(i) and, preferably, have a Primary (Dermal) Irritation Score of 5.00 or less, more preferably 1.5 or less (See p. 5, 1.19), or even 0.50 or less, and most desirably 0.09 or less, when tested by the skin irritation protocol of 16 CFR 1500.41 and 16 CFR 1500.3(c)(4). Similarly, it is also preferable that the organic solvent is not classified an eye irritant by 16 CFR 1500.42 and has an MIR of 2.0 or less, preferably 1.5 or less, or even 1.0 or less.

The amount of solvent that can be used in the inventive aqueous primer dispersion can vary widely and essentially any amount can be used. Normally, however, the inventive aqueous primer dispersion is designed to have a VOC content as low as possible, typically 150 g/L (grams per liter) or less, more commonly 100 g/L or less, and desirably 75 g/L or less, or even 50 g/L or less, as measured by ASTM 3960. In general this means that the amount of organic solvent will usually be between about 25-400 wt. %, based on the weight of the polymer particles in the dispersion. Concentrations on the order of 50-200 wt. %, 75-150 wt. %, or even 100-135 wt. %, based on the weight of the polymer particles in the dispersion, are especially interesting. This means that the concentration of organic solvent based on the weight of the inventive primer dispersions as a whole will typically be about 0.25-15 wt. %, more commonly about 0.5-10 wt. %, about 1-8 wt. %, or even 2-6 wt. %.

Mineral Thickener

Another component of the inventive aqueous primer dispersion is a mineral thickener. As well understood in the art, mineral thickeners are non-organic naturally occurring materials which increase the viscosities of aqueous compositions to which they are added. They are referred to by a number of different terms including mineral thickeners, thixotropic clays, thixotropic mineral flow control agents, etc., and can be composed of a wide variety of different naturally occurring minerals such as various aluminosilicates, bentonite, kaolin clay, thixotropic asbestos, Fuller's earth, etc. They are described, for example, in U.S. Pat. No. 4,138,384, U.S. Pat. No. 4,495,228, U.S. Pat. No. 4,696,319, U.S. Pat. No. 4,261,308 and U.S. Pat. No. 5,158,918, the disclosures of which are incorporated herein by reference.

The preferred mineral thickener is Laponite RD, which is a highly-purified, synthetic colloidal smectite clay available from Southern Clay Products, Inc. of Austin, Tex., which is commonly used to impart viscosity and suspension properties to glaze suspensions. It forms highly thixotropic, heat stable, clear gels when dispersed in water at a 2% solids level. It is easily dispersed without high shear mixing equipment and has a very high surface area. It provides synergistic viscosity and suspension properties when combined with various organic polymers. It is free of crystalline silica and low in transition metals and other impurities.

The amount of mineral thickener that is included in the inventive aqueous primer dispersions should be enough to achieve a noticeable improvement in bonding strength of the subsequently applied water-based protective coating but not so much that the primer dispersion becomes too viscous. In general, this means that the amount of mineral thickener is normally slightly in excess of the amount of polymer particles in the inventive aqueous primer dispersions, on a weight basis, although greater or lesser amounts of mineral filler can also be used. So, for example, the weight ratio of mineral thickener to polymer particles can typically be between 0.5:1 to 10:1, more commonly 1:1 to 7.5:1, 1.5:1 to 5:1, or even 2:1 to 4:1. This means that the concentration of mineral filler in the inventive aqueous primer dispersion will typically be about 0.75-15 wt. %, more commonly about 1-10 wt. % or even 2.5-7 wt. %, based on the weight of these dispersions as a whole.

As indicated above, the bonding strength of a subsequently-applied water-based protective coating to a fluorocarbon substrate can be significantly enhanced by priming the substrate with the inventive aqueous primer dispersion. Although not wishing to be bound to any theory, it is believed that this improved bonding strength is due to that fact that the polymer particles of the inventive aqueous primer dispersion, as well as the substrate especially if it includes a non-fluorocarbon polymer portion, are at least partially softened and/or swelled by the organic solvent also included in this dispersion. Accordingly, when the polymer particles coalesce and bond together to form a coherent primer layer, the solvent-softened surfaces of these particles and the solvent-softened surfaces of the substrate bond together more securely. Moreover, the mineral filler in the system, which is incorporated into this coherent primer layer as the polymer particles coalesce, enhances the strength of this primer layer due to its relatively hard, rigid nature. In addition, this primer layer forms stronger bonds with later-applied protective coatings, because it is composed of two different materials of distinctly different chemical nature. In any event, primer layers formed from the combination of polymer particles and mineral fillers have been found to provide better adhesive strength than primer layers formed from polymer particles alone, provided that suitable concentrations of these ingredients are used, as described above.

Additional Ingredients

As indicated above, the inventive aqueous primer dispersion are conveniently made from "source dispersions," i.e., a commercially-available polymer dispersion typically containing about 30-70 wt. % polymer particles stably dispersed in the aqueous phase by means of one or more free surfactants. Normally, these materials include a variety of additional conventional ingredients such as fillers, wetting agents, thixotropic agents, coalescing agents, plasticizers, fire retardants, defoaming agents, biocides, fungicides, dyes, pigments, and other additives. These additional ingredients can also be included in the inventive aqueous primer dispersions, either as a result of being present in the source dispersions used to make the inventive aqueous primer dispersions or as a result of being separately added. In either case, care should be taken to avoid additives which would adversely affect the bond strength-enhancing activity of the inventive aqueous primer dispersions, which can easily be determined through routine experimentation. To this end, the inventive aqueous primer dispersions are preferably made without (i.e., they are free or essentially free of) additional free surfactants.

EXAMPLES

In order to illustrate this invention more thoroughly, the following working examples are provided. In these examples, an inventive aqueous primer composition containing the ingredients set forth in the following Table 1 was used to provide primer layers on test blanks formed from rigid sheets of Kynar 500® fluorocarbon (70 wt. % polyvinylidene homopolymer+30 wt. % acrylic resin) by depositing 0.50 gals per 100 square feet (~204 cc/m$^2$) of the dispersion onto the test blank, spreading the deposited dispersion by a draw down bar to form a uniform layer of the dispersion on the substrate, and then allowing the deposited dispersion to dry for 4-6 hours.

Example 1

TABLE 1

Ingredient List of Aqueous Primer Dispersion of Example 1

| Ingredient | Density, lb/gal. | Quantity | | |
|---|---|---|---|---|
| | | U.S. Gallons | Pounds | Wt. % |
| Rhoplex WL 100 | 8.66 | 2.89 | 25.00 | 2.99 |
| Laponite RD | 8.32 | 3.61 | 30.00 | 3.59 |
| DMSO | 8.62 | 1.45 | 12.50 | 1.50 |
| NMP | 8.62 | 1.45 | 12.50 | 1.50 |
| Raybo No Rust 60 (Rust Inhibitor) | 9.32 | 0.86 | 8.00 | 0.96 |
| Tap Water | | 89.75 | 747.61 | 89.47 |
| Total | | 100.00 | 835.61 | 100.00 |

The adhesive strength of the coating to its substrate was then determined by peeling the coating from the substrate by hand and noting whether the adhesive strength was poor, fair, good or excellent. In the case of Example 1, it was judged that the adhesive strength of the coating was excellent. In particular, the coating could not be peeled from the substrate. Rather the coating itself exhibited cohesive failure.

Comparative Examples A-C

Example 1 was repeated except that certain variations were made in the composition of the aqueous primer dispersions being tested. The compositions of these dispersions are set forth in the following Table 2, while the results obtained are set forth in the following Table 3:

TABLE 2

Ingredient List of Aqueous Primer Dispersions of Example 1 and Comparative Examples A-C

| | Wt. % | | | |
|---|---|---|---|---|
| Ingredient | Ex 1 | Ex A | Ex B | Ex C |
| Rhoplex WL 100 | 2.99 | 50.01 | 2.97 | 2.97 |
| Thickener | 3.59% Laponite RD | 3.53% Laponite RD | 3.57% Laponite RD | 2.38% hydroxyethylcellulose (Natrosol 250 LR) |

TABLE 2-continued

Ingredient List of Aqueous Primer Dispersions of
Example 1 and Comparative Examples A-C

| | Wt. % | | | |
|---|---|---|---|---|
| Ingredient | Ex 1 | Ex A | Ex B | Ex C |
| Solvent | 1.50% DMSO + 1.50% NMP | 1.47% DMSO + 1.470% NMP | 2.97% p-chlorobenzo-trifluoride (Oxsol 100) | 2.97% NMP |
| Rust Inhibitor (Raybo No Rust 60) | 0.96 | 0.94 | 0.95 | 0.95 |
| Tap Water | 89.47 | 42.59 | 89.54 | 90.73 |
| Total | 100.00 | 100.00 | 100.00 | 100.00 |

TABLE 3

Results

| Example | Adhesive Strength of Applied Coatings |
|---|---|
| 1 | Excellent-Could not be peeled from substrate. Cohesive Failure |
| A | Poor-Pealed easily from substrate. Complete adhesive failure |
| B | Poor-Peeled from substrate. 95% adhesive failure |
| C | Poor-Peeled easily from substrate. Complete adhesive failure |
| No primer | Poor-Peeled easily from substrate. Complete adhesive failure |

The above comparative examples show the importance of formulating the inventive aqueous dispersions in the manner described above. In particular, the above comparative examples show that the adhesive strength of the applied coating is poor if too much dispersion is used (Ex. A), a non-mineral thickener is used (Ex. B), or an organic solvent exerting little or no swelling effect on the polymer particles is used (Ex. C).

Comparative Example D and Examples 2-6

Examples 1 and A-C were repeated using aqueous primer dispersions having the same composition as the dispersion of Example 1 except for certain minor changes. These changes, as well as the results obtained, are set forth in the following Table 4:

TABLE 4

Changes from Base Composition and Results

| Example | Change from Base Composition | Results |
|---|---|---|
| D | −0.12 wt. % tint base having high concentration of free surfactant added | Poor-Complete adhesive failure |
| 2 | −0.12% $TiO_2$ added (no free surfactant) | Very Good |
| 3 | −3.11 wt. % Ucar 162 ($T_g = 7°$ C.) replaced Rhoplex WL 100 −2.51 wt. % Laponite RD | Fair-Adhesive Failure but some resistance |
| 4 | −3.11 wt. % Carboset 2254 ($T_g = -25°$ C.) replaced Rhoplex WL 100 −2.51 wt. % Laponite RD | Fair-Could be peeled but had some spots of cohesive failure |
| 5 | −3.11 wt. % Rhoplex Ec 1791 ($T_g = -45°$ C.) replaced Rhoplex WL 100 −2.51 wt. % Laponite RD | Good-Significant resistance but a little spotty |
| 6 | −2.99 wt. % self-stabilized acrylic replaced Rhoplex WL 100 | Very good-Almost impossible to remove without cohesive failure |

The above Examples 3, 4 and 5 show that good results are obtained even if less than an optimal amount of mineral thickener is used. In addition, these examples further show that good results are obtained even if polymers with different glass transition temperatures are used. Meanwhile, Comparative Example D and Example 2 show the importance of minimizing the amount of free surfactant in the aqueous primer dispersions of this invention. In both examples, identical amounts of colorants were added to the aqueous primer dispersion of Example 1 (base case composition). In Example 2, the colorant contained no additional surfactant, and the results obtained were essentially as good as those of Example 1. In contrast, the colorant used in Comparative Example D contained significant additional free surfactant, and the results obtained were poor. This tends to confirm the viewpoint, as indicated above, that excessive free surfactant concentration is the underlying cause of poor adhesion in earlier water-based fluorocarbon primers. Finally, Example 6 further confirms the importance of minimizing the amount of free surfactant in the composition, since it shows that an aqueous primer dispersion made without any free surfactant, i.e., made with a self-stabilized polymer dispersion only, also exhibits excellent adhesive properties.

Although only a few embodiments of this invention have been described above, it should be appreciated that many modifications can be made without departing from the spirit and scope of the invention. All such modifications are intended to be included within the scope of this invention, which is to limited only by the following claims:

The invention claimed is:

1. An aqueous primer dispersion for use in coating a fluorocarbon substrate to increase the adhesive strength between the fluorocarbon substrate and a subsequently applied water-derived protective coating, the aqueous primer dispersion consisting essentially of
   (1) about 0.5-10 wt. % of at least one aqueous acrylic polymer source dispersion containing acrylic polymer particles,
   (2) about 25-400 wt. % based on the weight of all polymer particles in the aqueous primer dispersion of an organic solvent capable of softening the acrylic polymer particles, and
   (3) a mineral thickener, wherein the weight ratio of mineral thickener to all of the polymer particles in the aqueous primer dispersion is between about 1:1 to 7.5:1,
wherein the total amount of aqueous dispersions used to make the aqueous primer dispersion is about 10 wt. % or less, and further wherein the total amount of all polymer particles in the aqueous primer dispersion which are surfactant-stabilized, if any, is no more than 8 wt. %, and further wherein essentially all of the polymer particles in the aqueous primer dispersion are formed from an acrylic polymer.

2. The aqueous primer dispersion of claim 1, wherein the weight ratio of mineral thickener to polymer particles is between about 1.5:5 to 5:1.

3. The aqueous primer dispersion of claim 2, wherein the weight ratio of mineral thickener to polymer particles is between about 2:1 to 4:1.

4. The aqueous primer dispersion of claim 1, wherein the total amount of aqueous dispersions used to make the aqueous primer dispersion is about 6 wt. % or less.

5. The aqueous primer dispersion of claim 4, wherein the organic solvent is at least one of pyrrolidones having a hydrogen or $C_1$-$C_4$ alkyl attached to the nitrogen of the pyrrolidone ring, lactones, organic esters have 6-10 carbon atoms, propylene carbonate, $C_1$-$C_8$ propionates, glycol ethers, isobutyl isobutyrate, mixtures of esters containing at least three of hexyl, heptyl, octyl, nonyl and decyl acetates and dimethyl sulfoxide.

6. The aqueous primer dispersion of claim 5, wherein the organic solvent includes N-methylpyrrolidone.

7. The aqueous primer dispersion of claim 6, wherein the organic solvent includes dimethyl sulfoxide.

8. The aqueous primer dispersion of claim 1, wherein the organic solvent is at least one of pyrrolidones having a hydrogen or $C_1$-$C_4$ alkyl attached to the nitrogen of the pyrrolidone ring, lactones, organic esters have 6-10 carbon atoms, propylene carbonate, $C_1$-$C_8$ propionates, glycol ethers, isobutyl isobutyrate, mixtures of esters containing at least three of hexyl, heptyl, octyl, nonyl and decyl acetates and dimethyl sulfoxide.

9. The aqueous primer dispersion of claim 8, wherein the organic solvent includes N-methylpyrrolidone.

10. The aqueous primer dispersion of claim 9, wherein the organic solvent includes dimethyl sulfoxide.

11. The aqueous primer dispersion of claim 10, wherein the mineral filler is a synthetic colloidal smectite clay.

12. The aqueous primer dispersion of claim 10, wherein the mineral filler is a synthetic colloidal, thixotropic clay.

13. The aqueous primer dispersion of claim 9, wherein the mineral filler is a synthetic colloidal, thixotropic clay.

14. A process for increasing the bond strength between a fluorocarbon substrate and a water-based protective coating on the substrate comprising depositing an aqueous primer dispersion on the substrate to form a coherent primer layer before application of the protective coating, wherein the aqueous primer dispersion comprises the dispersion of claim 1.

* * * * *